United States Patent
Tabata et al.

(10) Patent No.: US 9,444,380 B2
(45) Date of Patent: Sep. 13, 2016

(54) POWER CONVERTER AND CONTROL METHOD FOR POWER CONVERTER

(75) Inventors: Mitsunori Tabata, Tokyo (JP); Masato Mori, Tokyo (JP); Kenji Nakajima, Tokyo (JP); Kenichi Akita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/352,202

(22) PCT Filed: Dec. 15, 2011

(86) PCT No.: PCT/JP2011/079053
§ 371 (c)(1),
(2), (4) Date: Apr. 16, 2014

(87) PCT Pub. No.: WO2013/088552
PCT Pub. Date: Jun. 20, 2013

(65) Prior Publication Data
US 2014/0292286 A1    Oct. 2, 2014

(51) Int. Cl.
| | |
|---|---|
| *H02P 9/00* | (2006.01) |
| *H02P 9/10* | (2006.01) |
| *H02P 3/22* | (2006.01) |
| *B60R 16/03* | (2006.01) |
| *H02P 25/22* | (2006.01) |
| *H02P 9/48* | (2006.01) |

(52) U.S. Cl.
CPC .............. *H02P 9/10* (2013.01); *B60R 16/03* (2013.01); *H02P 3/22* (2013.01); *H02P 9/102* (2013.01); *H02P 9/48* (2013.01); *H02P 25/22* (2013.01); *H02P 29/0241* (2016.02); *H02P 29/032* (2016.02)

(58) Field of Classification Search
CPC .............. H02P 9/48; H02P 9/10; H02P 3/22; H02P 29/022; H02P 25/22
USPC ............ 322/91, 24, 28, 59, 68, 77; 307/10.1
See application file for complete search history.

(56) References Cited

U.S. PATENT DOCUMENTS

| | | | |
|---|---|---|---|
| 6,504,346 B2 * | 1/2003 | Nakamura et al. ............. | 322/90 |
| 6,803,748 B2 * | 10/2004 | Peter ............................... | 322/29 |
| 7,759,909 B2 * | 7/2010 | Graovac et al. ................ | 322/59 |
| 7,973,517 B2 | 7/2011 | Nakajima et al. | |

(Continued)

FOREIGN PATENT DOCUMENTS

| | | |
|---|---|---|
| JP | 3396955 B2 | 4/2003 |
| JP | 3840880 B2 | 11/2006 |

(Continued)

OTHER PUBLICATIONS

Communication dated Mar. 24, 2015, issued by the Japan Patent Office in corresponding Japanese Application No. 2013-549024.

*Primary Examiner* — Julio Cesar Gonzalez Ramirez
(74) *Attorney, Agent, or Firm* — Sughrue Mion, PLLC

(57) ABSTRACT

A control section is configured to, when it is detected that a voltage of a B-terminal of a power generator has exceeded a first predetermined voltage value, turn on all switching elements of a negative arm of a bridge circuit connected to one set of armature windings and turn off all switching elements of a positive arm, and reduce a field current flowing in a field winding. The control section is configured to thereafter turn off all the turned-on switching elements when a predetermined condition is satisfied.

13 Claims, 7 Drawing Sheets

(56) References Cited

U.S. PATENT DOCUMENTS

| | | |
|---|---|---|
| 8,212,512 B2 | 7/2012 | Maeda et al. |
| 2005/0093520 A1* | 5/2005 | Muramatsu et al. .......... 322/29 |
| 2009/0128076 A1* | 5/2009 | Taniguchi ................ 318/400.41 |
| 2010/0001672 A1* | 1/2010 | Maeda et al. ............ 318/400.22 |
| 2011/0074364 A1* | 3/2011 | Nakajima et al. .............. 322/19 |
| 2011/0156664 A1* | 6/2011 | Horihata ........................ 322/24 |
| 2011/0215773 A1* | 9/2011 | Iwai ............................... 322/28 |

FOREIGN PATENT DOCUMENTS

| | | |
|---|---|---|
| JP | 2008-512077 A | 4/2008 |
| JP | 2010016953 A | 1/2010 |
| JP | 2011-78216 A | 4/2011 |
| JP | 4675299 B2 | 4/2011 |
| JP | 2011-135695 A | 7/2011 |

\* cited by examiner

POWER CONVERTER AND CONTROL METHOD FOR POWER CONVERTER

CROSS REFERENCE TO RELATED APPLICATIONS

This application is a National Stage of International Application No. PCT/JP2011/079053, filed on Dec. 15, 2011, the contents of all of which are incorporated herein by reference in their entirety.

TECHNICAL FIELD

The present invention relates to a power converter, which is built in a vehicle power generator to convert AC power generated by a rotating electrical machine into DC power and supply the DC power to a battery or a vehicle electric load, and relates to a power converter control method.

BACKGROUND ART

A power converter built in a vehicle power generator is connected between a rotating electrical machine and a battery or a vehicle electric load. The power converter rectifies AC power output from the rotating electrical machine to convert the AC power into DC power, and supplies the DC power to the battery or the vehicle electric load.

In recent years, for the purposes of increasing a request of the amount of generated power and achieving noise reduction, higher efficiency, and the like, it has been proposed to use a field winding type rotating electrical machine including a plurality of sets of armature windings as a rotating electrical machine, or proposed to employ MOSFETs as switching elements of a bridge circuit for AC-DC conversion to perform so-called synchronous rectification (see, for example, Patent Literature 1).

By the way, in the case of abrupt load dump, such as when a cable connecting the power generator and the battery to each other is disconnected during power generation, generated power becomes excessive temporarily, with the result that a high voltage (load dump surge) may be generated at a B-terminal of the power generator.

As a countermeasure, there has been known an AC power generator that suppresses the load dump surge with use of avalanche breakdown of the MOSFET (see, for example, Patent Literature 2).

Further, there has been known a controller for a field winding type rotating electrical machine, which suppresses the load dump surge by turning on all switching elements of a negative arm or a positive arm of an inverter to short-circuit the armature windings (see, for example, Patent Literature 3).

CITATION LIST

Patent Literature

[PTL 1] JP 2005-328690 A
[PTL 2] JP 2005-506028 A
[PTL 3] JP 3840880 B2

SUMMARY OF INVENTION

Technical Problems

The related art, however, has the following problems.

In the case where the load dump surge is suppressed by the method disclosed in Patent Literature 2, a MOSFET with a large rating needs to be employed in order to absorb generated load dump energy. Thus, there is a problem in that cost is high.

Further, in the case where the load dump surge is suppressed by the method disclosed in Patent Literature 3, electric power cannot be supplied from the armature to the outside during the short-circuit operation. Accordingly, when the load dump surge is generated due to battery disconnection, there is a problem in that the B-terminal voltage may instantly decrease to make it impossible to supply electric power to a connected vehicle electric load unless a large-capacity smoothing capacitor is built in the controller.

Note that, in general, the vehicle power generator and the controller therefor are installed in close vicinity of an engine, and are therefore required to operate at extremely high atmosphere temperature. Accordingly, it is difficult to use an inexpensive, large-capacity aluminum electrolytic capacitor, and an expensive, small-capacity ceramic capacitor is used in most cases. Consequently, the cost becomes higher, and it is difficult to realize the above-mentioned condition.

The present invention has been made in order to solve the above-mentioned problems, and it is an object thereof to provide a power converter and a power converter control method that are capable of suppressing a load dump surge to prevent an overvoltage without increasing cost caused by use of a large MOSFET or a large-capacity smoothing capacitor.

Solution to Problems

According to one embodiment of the present invention, there is provided a power converter, which is built in a power generator, the power converter being connected to a rotating electrical machine including a field winding and a plurality of sets of armature windings and being configured to convert AC power generated by the rotating electrical machine into DC power, the power converter including: a field power conversion section for controlling a field current flowing in the field winding; an armature power conversion section including bridge circuits, the bridge circuits being provided correspondingly to the plurality of sets of armature windings and each including switching elements of a positive arm and switching elements of a negative arm; and a control section configured to, when it is detected that a voltage between a B-terminal and an E-terminal as input and output terminals of the power generator has exceeded a first predetermined voltage value: turn on all the switching elements of the negative armor the positive arm of the bridge circuit connected to a part of the plurality of sets of armature windings and turn off all the switching elements of the positive arm or the negative arm that is paired with one of the negative arm and the positive arm; reduce the field current flowing in the field winding to start an operation of reducing load dump energy; and thereafter turn off all the turned-on switching elements when a predetermined condition is satisfied.

Further, according to one embodiment of the present invention, there is provided a control method for a power converter, which is built in a power generator, the power converter being connected to a rotating electrical machine including a field winding and a plurality of sets of armature windings and being configured to convert AC power generated by the rotating electrical machine into DC power, the control method including, when it is detected that a voltage between a B-terminal and an E-terminal as input and output terminals of the power generator has exceeded a first predetermined voltage value, the steps of: turning on all switching elements of a negative arm or a positive arm of a bridge circuit connected to a part of the plurality of sets of armature windings and turning off all the switching elements of the positive arm or the negative arm that is paired with one of the negative arm and the positive arm; reducing a field current flowing in the field winding; and thereafter turning off all the turned-on switching elements when a predetermined condition is satisfied.

Advantageous Effects of Invention

According to the power converter and the control method for a power converter of the embodiments of the present invention, the control section (step) is configured to, when it is detected that the voltage between the B-terminal and the E-terminal as the input and output terminals of the power generator has exceeded the first predetermined voltage value: turn on all the switching elements of the negative arm or the positive arm of the bridge circuit connected to a part of the plurality of sets of armature windings and turn off all the switching elements of the positive arm or the negative arm that is paired with one of the negative arm and the positive arm; reduce the field current flowing in the field winding to start the operation of reducing load dump energy; and thereafter turn off all the turned-on switching elements when the predetermined condition is satisfied.

Consequently, the load dump surge can be suppressed to prevent an overvoltage without increasing cost caused by use of a large MOSFET or a large-capacity smoothing capacitor.

Further, even after the battery is disconnected, power generation can be continued for the remaining vehicle electric load.

DESCRIPTION OF EMBODIMENTS

Figure 1:
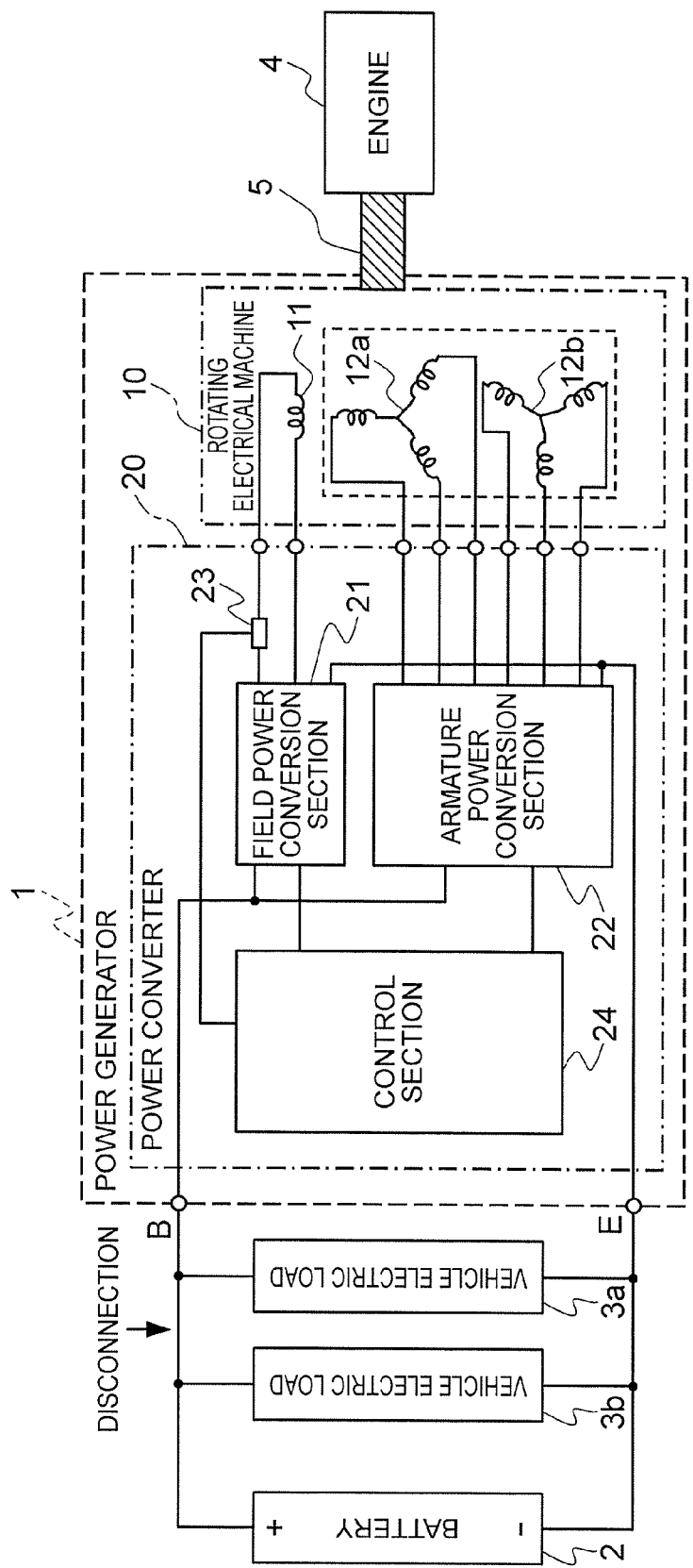
FIG. 1 is a configuration diagram illustrating a power generator including a power converter according to a first embodiment of the present invention and illustrating a vehicle system equipped with the power generator.

Now, a power converter and a power converter control method according to exemplary embodiments of the present invention are described with reference to the drawings. In the drawings, like reference symbols denote like or corresponding parts.

First Embodiment

FIG. 1 is a configuration diagram illustrating a power generator 1 including a power converter 20 according to a first embodiment of the present invention and illustrating a vehicle system equipped with the power generator 1. In FIG. 1, the vehicle system includes the generator 1, a battery 2, vehicle electric loads 3$a$ and 3$b$, an engine 4, and a belt 5.

The power generator 1 is connected to the engine 4 via the belt 5 or the like serving as power transmission means. Further, the power generator 1 includes a B-terminal serving as a high potential side output terminal for electric power and an E-terminal serving as a low potential side output terminal for electric power. The battery 2, various kinds of the vehicle electric loads 3$a$ and 3$b$, and the like are connected between the B-terminal and the E-terminal.

The power generator 1 includes a rotating electrical machine 10 and the power converter 20.

The rotating electrical machine 10 includes a rotor and a stator. The rotor includes a field winding (field coil) 11 for generating a field magnetic flux when supplied with a field current. The stator includes two sets of armature windings 12$a$ and 12$b$. When the rotor is rotated in a state in which the field magnetic flux is generated in the field winding 11, an induced voltage is generated in the armature windings 12$a$ and 12$b$ to generate electric power.

The power converter 20 includes a field power conversion section 21, an armature power conversion section 22, a field current sensor 23 for detecting the field current, and a control section 24 for controlling the field power conversion section 21 and the armature power conversion section 22.

The field power conversion section 21 operates in response to an ON/OFF command (hereinafter referred to as "gate signal") of a switching element sent from the control section 24, and supplies the field current to the field winding 11 based on PWM control. In general, a half bridge circuit including MOSFETs is used as the field power conversion section 21.

The armature power conversion section 22 operates in response to a gate signal sent from the control section 24, and rectifies an armature current generated from the armature windings 12$a$ and 12$b$ to supply electric power to the battery 2 or the vehicle electric loads 3$a$ and 3$b$.

The control section 24 generates the gate signals to the field power conversion section 21 and the armature power conversion section 22 so that a voltage between the B-terminal and the E-terminal (hereinafter referred to as "B-terminal voltage") may be maintained at a given constant voltage value. Note that, this voltage value is instructed from an external controller (not shown) via digital communications, for example.

Figure 2:
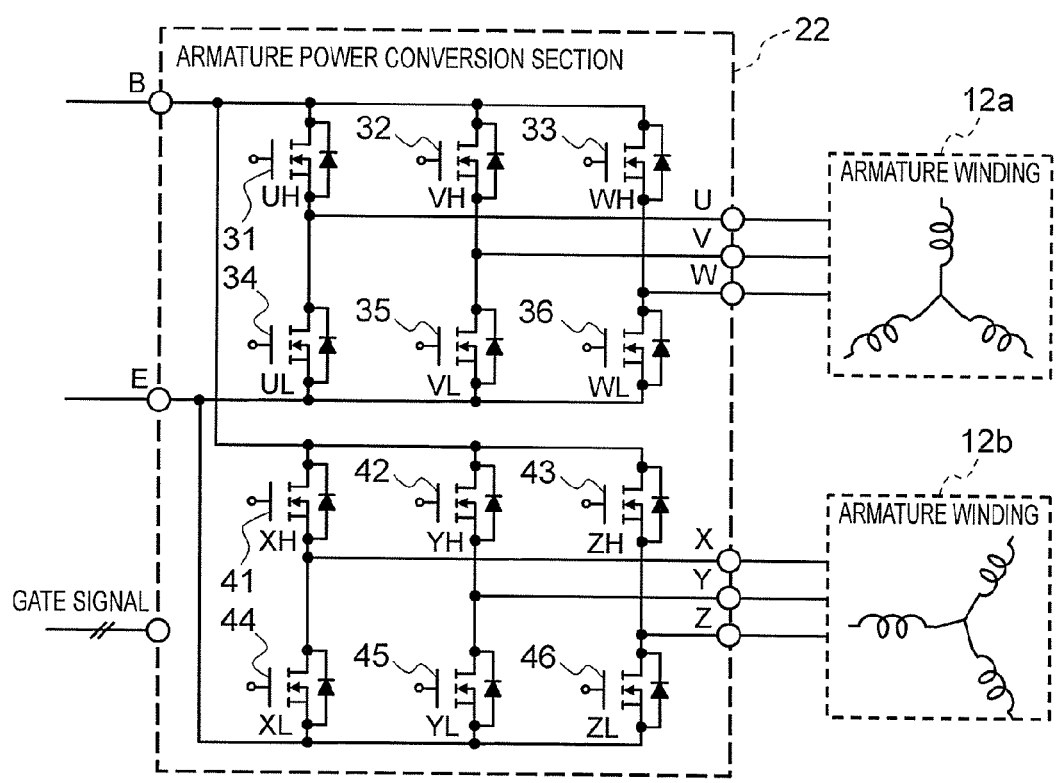
FIG. 2 is a configuration diagram illustrating an internal configuration of an armature power conversion section of FIG. 1 together with armature windings.

FIG. 2 is a configuration diagram illustrating an internal configuration of the armature power conversion section 22 of FIG. 1 together with the armature windings 12$a$ and 12$b$. In FIG. 2, in the armature power conversion section 22, two three-phase bridge circuits are provided correspondingly to the configurations of the armature windings 12$a$ and 12$b$.

Specifically, the armature power conversion section 22 includes UH31, VH32, and WH33 as MOSFETs of a positive arm of the armature winding 12$a$, UL34, VL35, and WL36 as MOSFETs of a negative arm of the armature winding 12$a$, XH41, YH42, and ZH43 as MOSFETs of a positive arm of the armature winding 12$b$, and XL44, YL45, and ZL46 as MOSFETs of a negative arm of the armature winding 12b. Those MOSFETs are turned on and off based on the gate signals from the control section 24.

Note that, those MOSFETs each include overvoltage suppression means for suppressing an overvoltage by some method when the overvoltage is applied. In the following example, avalanche breakdown is used as the overvoltage suppression means, but another method may be used.

Further, the overvoltage may be suppressed by interposing an overvoltage suppression element such as a Zener diode in parallel to the MOSFET. In this case, "heat generation of the MOSFET" in the following description can be directly replaced with "heat generation of the overvoltage suppression element".

Note that, the circuit configuration of the armature power conversion section 22 and a power generation method therefor themselves are the well-known art, and hence a more detailed description thereof is omitted.

Figure 3:
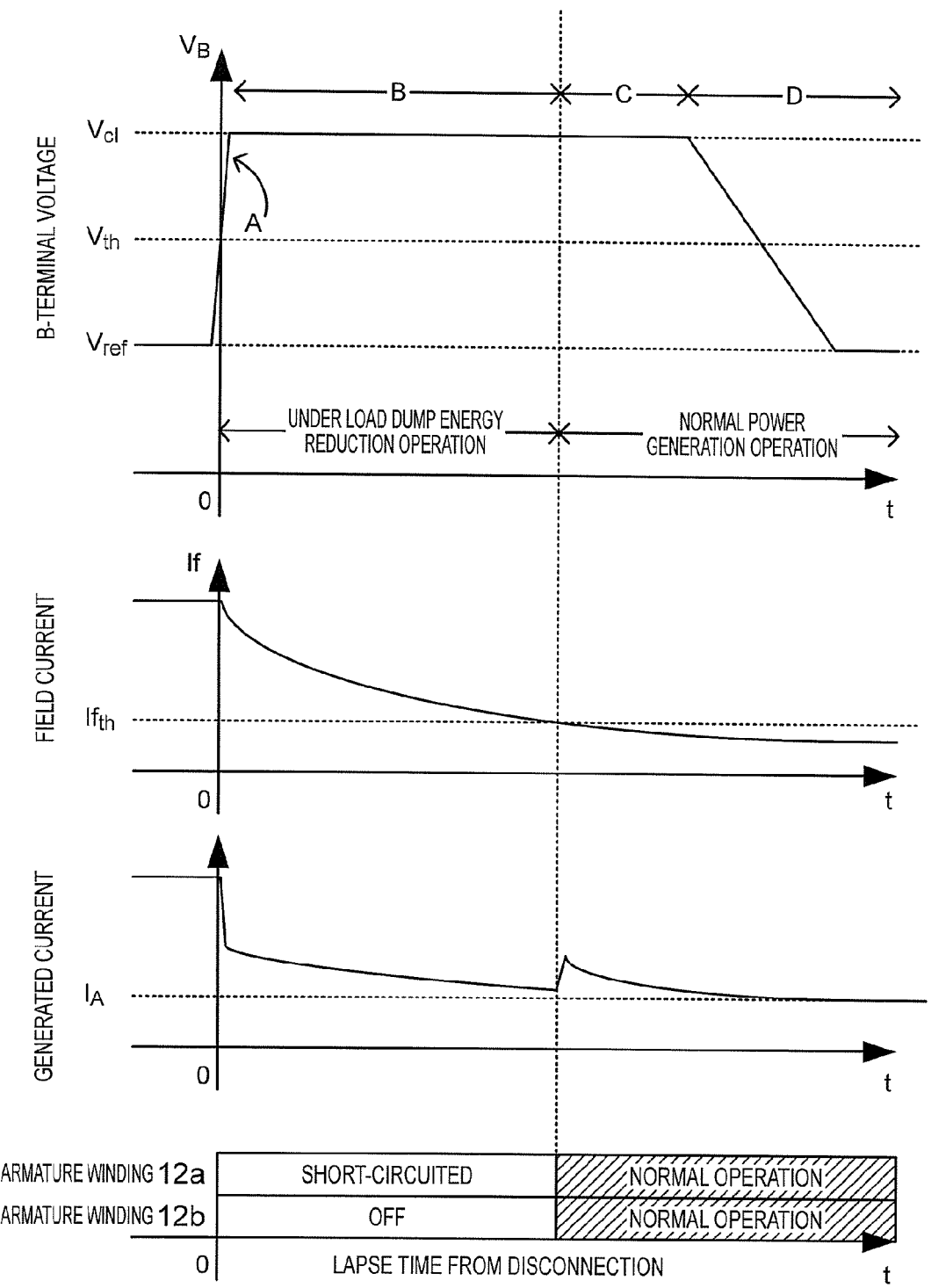
FIG. 3 is a timing chart showing an operation of the power converter according to the first embodiment of the present invention.

Subsequently, an operation of the power converter 20 during load dump is described with reference to FIG. 3. FIG. 3 is a timing chart showing the operation of the power converter 20 according to the first embodiment of the present invention.

First, when a part indicated by "disconnection" illustrated in FIG. 1 is disconnected during power generation by some reason in a state in which a generated voltage command is $V_{ref}$, the electric load connected to the power generator 1 becomes only the vehicle electric load 3a and is abruptly decreased as compared to before the disconnection.

In this case, in the rotating electrical machine 10 of the field winding type, the field current flowing in the field winding 11 is controlled to adjust the amount of generated power, but the inductance of the field winding 11 is large in general, and hence the control cannot follow the abrupt decrease in load and the electric power is generated excessively.

In a normal state, even when the rotating electrical machine 10 generates electric power excessively for a short time period, there is no problem because the battery 2 absorbs the excessive generated power to some extent. In the case of load dump due to the disconnection of the battery 2, however, the B-terminal voltage instantly increases because no electric storage means is present on the circuit (the above corresponds to the section A of FIG. 3).

In this case, when the B-terminal voltage exceeds a given constant voltage value $V_{th}$ (first predetermined voltage value), the control section 24 turns on all the MOSFETs (UL34, VL35, and WL36) of the negative arm of the bridge circuit connected to the armature winding 12a and turns off all the MOSFETs (UH31, VH32, and WH33) of the positive arm thereof.

Further, the control section 24 simultaneously turns off all the MOSFETs (XH41, YH42, ZH43, XL44, YL45, and ZL46) connected to the armature winding 12b, and limits the field current of the field winding 11 to weaken the field magnetic flux.

In this manner, the armature winding 12a is brought into a short-circuited state to output no generated current. Further, because the armature winding 12a is short-circuited, the generated current output from the armature winding 12b is also abruptly decreased due to magnetic interaction. In other words, the generated currents output from the respective armature windings 12a and 12b can be decreased rapidly.

During this period, the B-terminal voltage is limited by avalanche breakdown of the MOSFETs connected to the armature winding 12b, and is maintained at a substantially constant voltage value $V_{c1}$. In this case, because the generated currents are greatly decreased, the heat generation of the MOSFETs can be greatly reduced as compared to the case where the operation of reducing load dump energy is not performed (the above corresponds to the section B of FIG. 3).

After that, at the time point when the field current decreases to a given constant current value $If_{th}$, the control section 24 turns off all the MOSFETs (UL34, VL35, and WL36) of the negative arm of the bridge circuit connected to the armature winding 12a to cancel the short circuit of the armature winding 12a, thereby shifting to the normal power generation operation.

From this time point, the excessive generated power is all absorbed by the avalanche breakdown. Because the generated power is already decreased sufficiently in this stage, the heat generation due to the avalanche breakdown can be suppressed to be low (the above corresponds to the section C of FIG. 3).

Finally, the generated current decreases to be balanced with a consumption current $I_A$ of the vehicle electric load 3a, and the power generation is continued in the state in which the generated voltage command is $V_{ref}$ (the above corresponds to the section D of FIG. 3).

Note that, it is not always necessary to short-circuit the negative arm. For example, all the MOSFETs (XH41, YH42, and ZH43) of the positive arm of the bridge circuit connected to the armature winding 12b may be turned on. Further, in the first embodiment, the MOSFETs connected to the armature winding that is not subjected to short circuit are all turned off, but the normal power generation operation may be continued.

In this manner, only one of the two sets of the armature windings 12a and 12b is short-circuited, to thereby abruptly decrease the power generation capability and reduce the energy to be absorbed by the avalanche breakdown, and at the stage when the field current decreases to some extent, the short circuit is canceled so that the energy is absorbed only by the avalanche breakdown. Consequently, the power generation can be continued without dropping the voltage while suppressing the instant heat generation caused immediately after load dump.

As described above, according to the first embodiment, when it is detected that the voltage between the B-terminal and the E-terminal as input and output terminals of the power generator has exceeded the first predetermined voltage value, the control section turns on all the switching elements of the negative arm or the positive arm of the bridge circuit connected to a part of the sets of armature windings and turns off all the switching elements of the positive arm or the negative arm that is paired with one of the negative arm and the positive arm. In addition, the control section reduces the field current flowing in the field winding to start the operation of reducing load dump energy. After that, when a predetermined condition is satisfied (when the field current becomes equal to or lower than a predetermined current value), the control section turns off all the turned-on switching elements.

Consequently, the load dump surge can be suppressed to prevent an overvoltage without increasing the cost caused by use of a large MOSFET or a large capacity smoothing capacitor.

Further, even after the battery is disconnected, the power generation can be continued for the remaining vehicle electric load.

Second Embodiment

In the above-mentioned first embodiment, the description has been given of the case where, at the time point when the field current decreases to a given constant current value, the short circuit of the armature winding 12a is canceled to shift to the normal power generation operation. However, the condition of finishing the operation of reducing load dump energy is not limited thereto.

Figure 4:
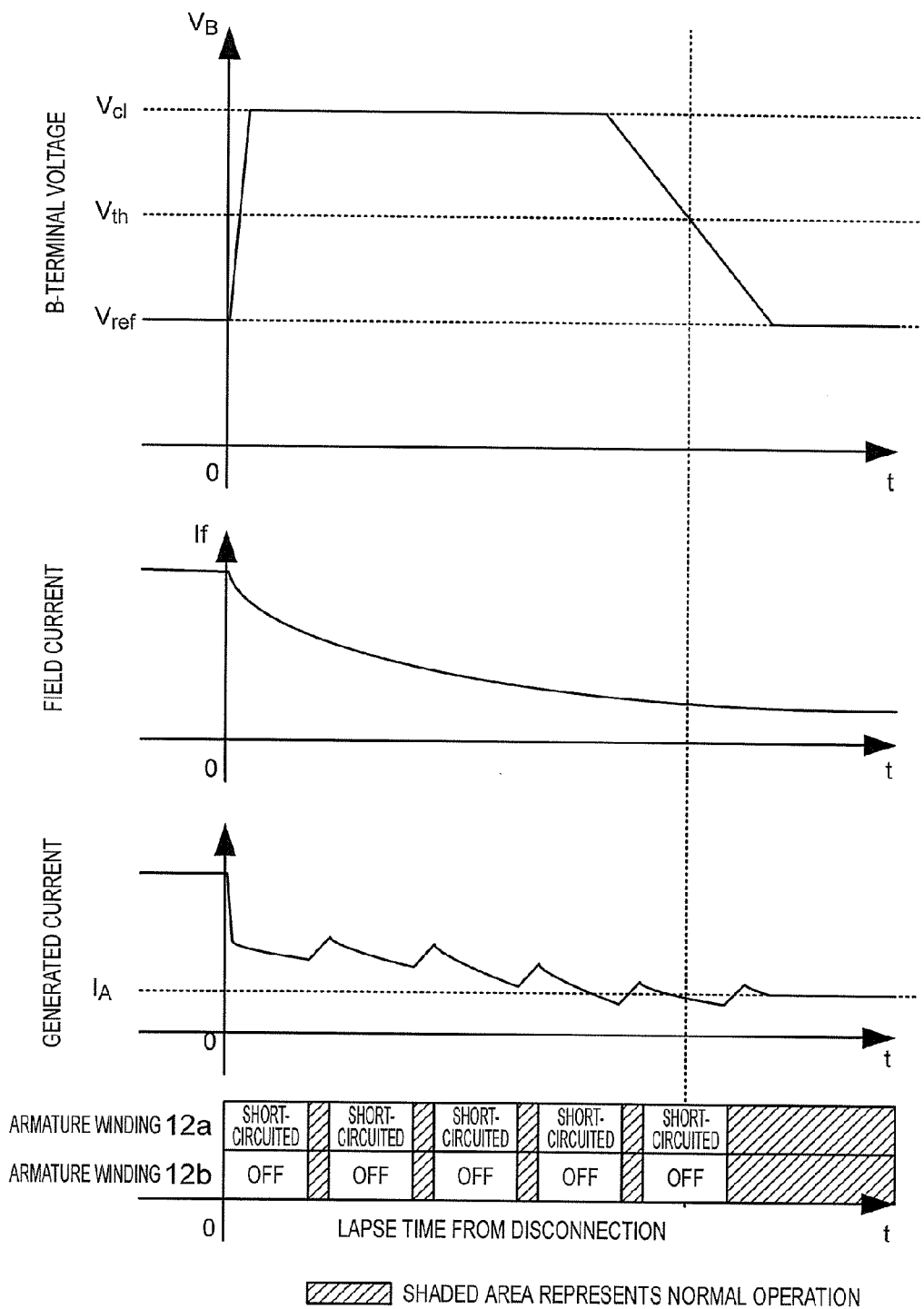
FIG. 4 is a timing chart showing an operation of a power converter according to a second embodiment of the present invention.

In the following, an operation of the power converter 20 during load dump is described with reference to FIG. 4. FIG. 4 is a timing chart showing the operation of the power converter 20 according to the second embodiment of the present invention. Note that, the condition of starting the operation of reducing load dump energy is the same as in the above-mentioned first embodiment, and hence a description thereof is omitted.

After the start of the operation of reducing load dump energy, at the time point when a given time period (hereinafter referred to as "duration time") has elapsed, the control section 24 turns off all the MOSFETs (UL34, VL35, and WL36) of the negative arm of the bridge circuit connected to the armature winding 12a to cancel the short circuit of the armature winding 12a, thereby shifting to the normal power generation operation.

In this case, when the B-terminal voltage exceeds the given constant voltage value $V_{th}$ after the shift to the normal power generation operation, the control section 24 immediately starts the operation of reducing load dump energy again. At this time, the time period until the operation of reducing load dump energy is started again is very short, which does not therefore greatly affect the heat generation of the MOSFETs.

As described above, according to the second embodiment of the present invention, when the duration time is finished, the operation of reducing load dump energy is finished irrespective of the magnitude of the field current. Consequently, by setting the duration time to be short, as shown in FIG. 4, the load dump surge is suppressed while the operation of reducing load dump energy and the normal power generation operation are repeated.

After that, at the time point when the consumption current $I_A$ of the vehicle electric load 3a and the current generated in the normal power generation operation are almost balanced with each other, the B-terminal voltage stops increasing, and the operation does not shift to the operation of reducing load dump energy. Accordingly, the power generation is continued in the state in which the generated voltage command is $V_{ref}$.

As described above, according to the second embodiment, the same effect as that in the first embodiment can be obtained. Specifically, an overheat can be avoided because the heat generation caused by avalanche breakdown becomes problematic immediately after the generation of load dump.

Third Embodiment

In a third embodiment of the present invention, a description has been given of the case where the condition of finishing the operation of reducing load dump energy is added in the above-mentioned first and second embodiments.

Figure 5:
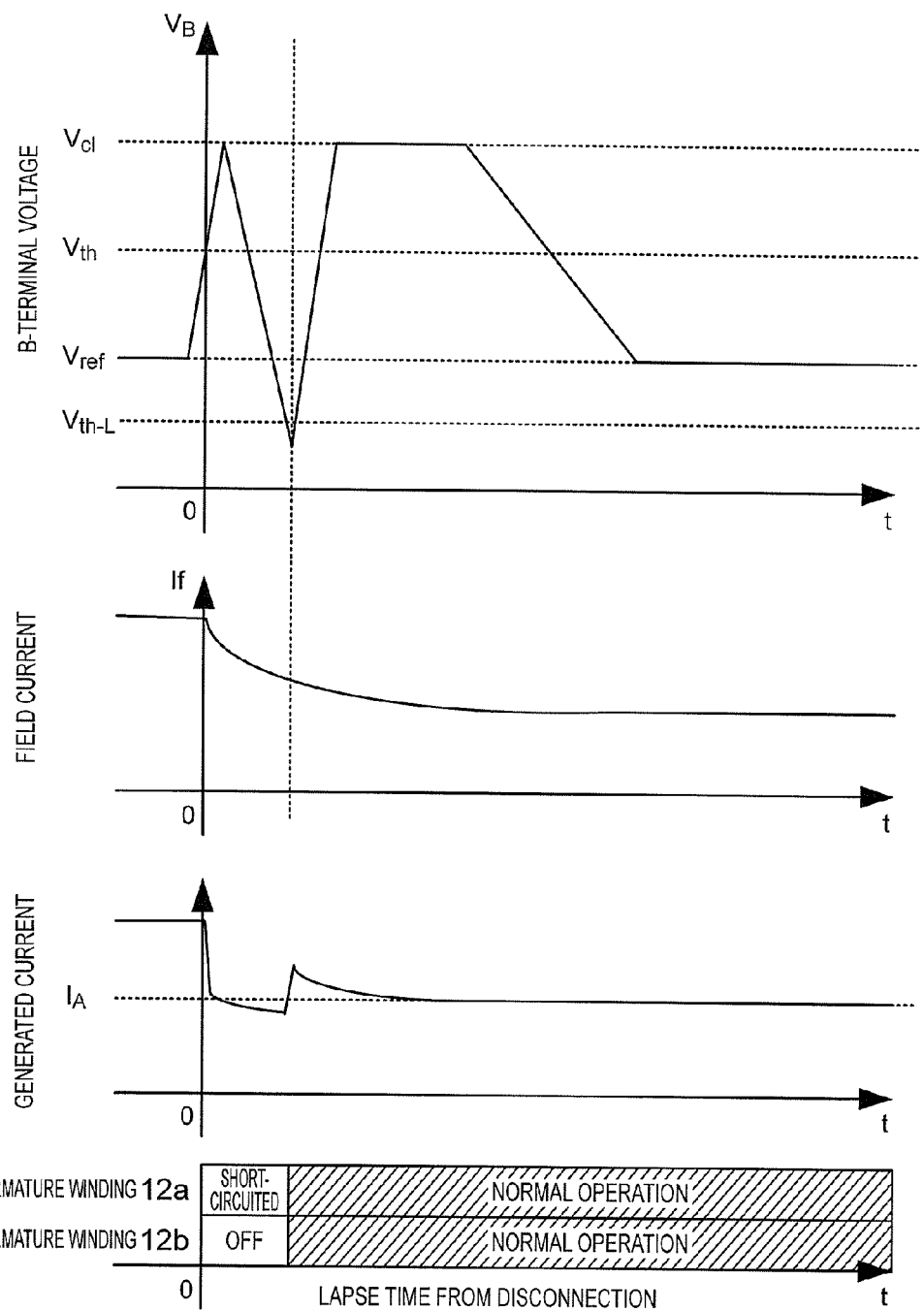
FIG. 5 is a timing chart showing an operation of a power converter according to a third embodiment of the present invention.

In the following, an operation of the power converter 20 during load dump is described with reference to FIG. 5. FIG. 5 is a timing chart showing the operation of the power converter 20 according to the third embodiment of the present invention. Note that, the condition of starting the operation of reducing load dump energy is the same as in the above-mentioned first embodiment, and hence a description thereof is omitted.

After the start of the operation of reducing load dump energy, when the consumption current $I_A$ of the vehicle electric load 3a (necessary generated current) exceeds the amount of power generated during the operation of reducing load dump energy (that is, in the state in which one set of armature windings is short-circuited), the generated power becomes insufficient and the B-terminal voltage decreases.

In such a case, unless the operation of reducing load dump energy is finished rapidly so as to increase the amount of generated power, the B-terminal voltage directly decreases to be 0 in the end, and the power generation cannot be continued.

On the other hand, when the B-terminal voltage increases again to exceed the voltage value $V_{th}$ after the finish of the operation of reducing load dump energy, there is a fear that the operation of reducing load dump energy may be started again to cause a hunting operation.

To deal with this problem, when the B-terminal voltage falls below a given constant voltage value $V_{th-L}$ (second predetermined voltage value, for example, 8 V) during the operation of reducing load dump energy, the control section 24 turns off all the MOSFETs to cancel the short circuit of the armature winding 12a, thereby shifting to the normal power generation operation. Further, the control section 24 inhibits a further operation of reducing load dump energy so that the load dump energy is absorbed only by the avalanche breakdown.

In this case, the drop of necessary generated power from before to after the load dump is small, and hence the load dump energy to be absorbed inside the power generator 1 does not become so large. Therefore, even when the load dump energy is absorbed only by the avalanche breakdown, the heat generation is not so problematic.

As described above, according to the third embodiment, the power generation can be continued even when the amount of necessary generated power after the generation of load dump exceeds the amount of power generated during the operation of reducing load dump energy (that is, in the state in which one set of armature windings is short-circuited).

Specifically, by short-circuiting the three phases on one side, the amount of generated power becomes half or less than the original one. Accordingly, in the case where the vehicle electric load equal to or large than the amount of generated power remains even after the load dump, the voltage decreases immediately after the start of the three-phase short circuit. In this case, even when the three-phase short circuit is canceled so that the load dump energy is absorbed only by the avalanche breakdown, the energy borne by the MOSFETs is not large, and hence the heat generation is not so problematic.

Further, if a further three-phase short circuit is not inhibited, a hunting operation occurs in the order of the start of the three-phase short circuit, the decrease in B-terminal voltage due to an insufficient amount of generated power, the finish of the three-phase short circuit in response to the detection of the low voltage, the increase in B-terminal voltage due to an excessive amount of generated power, and the start of the three-phase short circuit. From this reason, once the low voltage state is detected, a further three-phase short circuit is inhibited.

Fourth Embodiment

In a fourth embodiment of the present invention, a description is given of the case where the armature winding to be short-circuited in the operation of reducing load dump energy is changed in the above-mentioned second embodiment.

Figure 6:
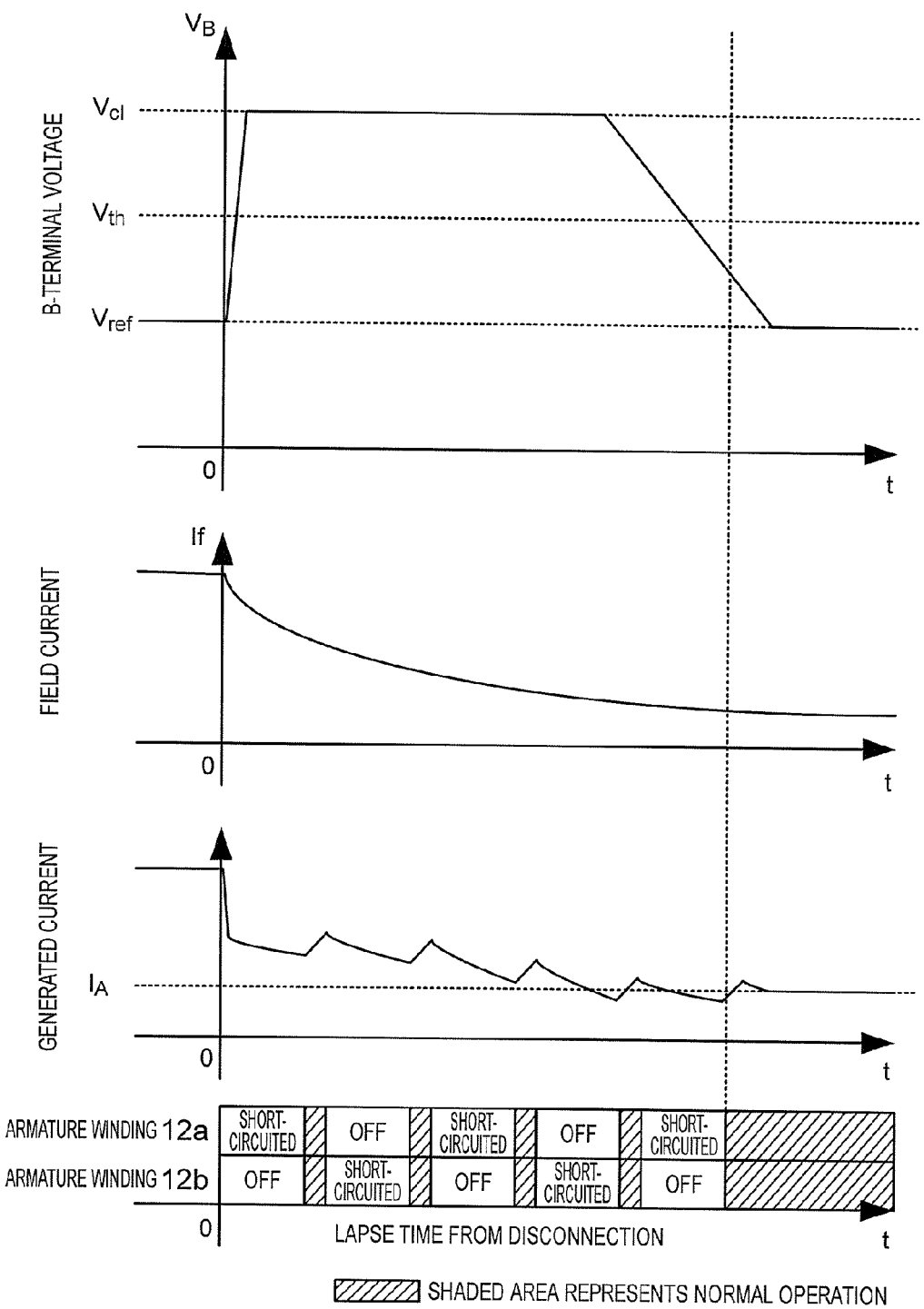
FIG. 6 is a timing chart showing an operation of a power converter according to a fourth embodiment of the present invention.

In the following, an operation of the power converter 20 during load dump is described with reference to FIG. 6. FIG. 6 is a timing chart showing the operation of the power converter 20 according to the fourth embodiment of the present invention. Note that, the condition of starting the operation of reducing load dump energy is the same as in the above-mentioned first embodiment, and hence a description thereof is omitted.

In the above-mentioned second embodiment, the description has been given of the case where the operation of reducing load dump energy and the normal power generation operation are repeatedly executed. However, in the fourth embodiment of the present invention, the set of armature windings to be short-circuited is switched to another set of armature windings each time.

In the example of FIG. 6, the armature winding 12a is short-circuited in the first operation of reducing load dump energy, and hence the armature winding 12b is short-circuited in the second operation of reducing load dump energy. Specifically, by setting the duration time in the second embodiment to be short (for example, 1 ms), the three-phase short circuit is performed alternately until the voltage decreases.

In the above-mentioned second embodiment, the MOSFETs subjected to avalanche breakdown are limited to the MOSFETs connected to one armature winding, and hence the heat generation concentrates on those MOSFETs. According to the fourth embodiment, however, the MOSFETs subjected to avalanche breakdown are switched over every constant time period, and hence the heat generation of the MOSFETs can be dispersed.

Fifth Embodiment

In a fifth embodiment of the present invention, a description is given of the case where a MOSFET to be turned on is switched over every given time period during the operation of reducing load dump energy described in the above-mentioned first embodiment.

Figure 7:
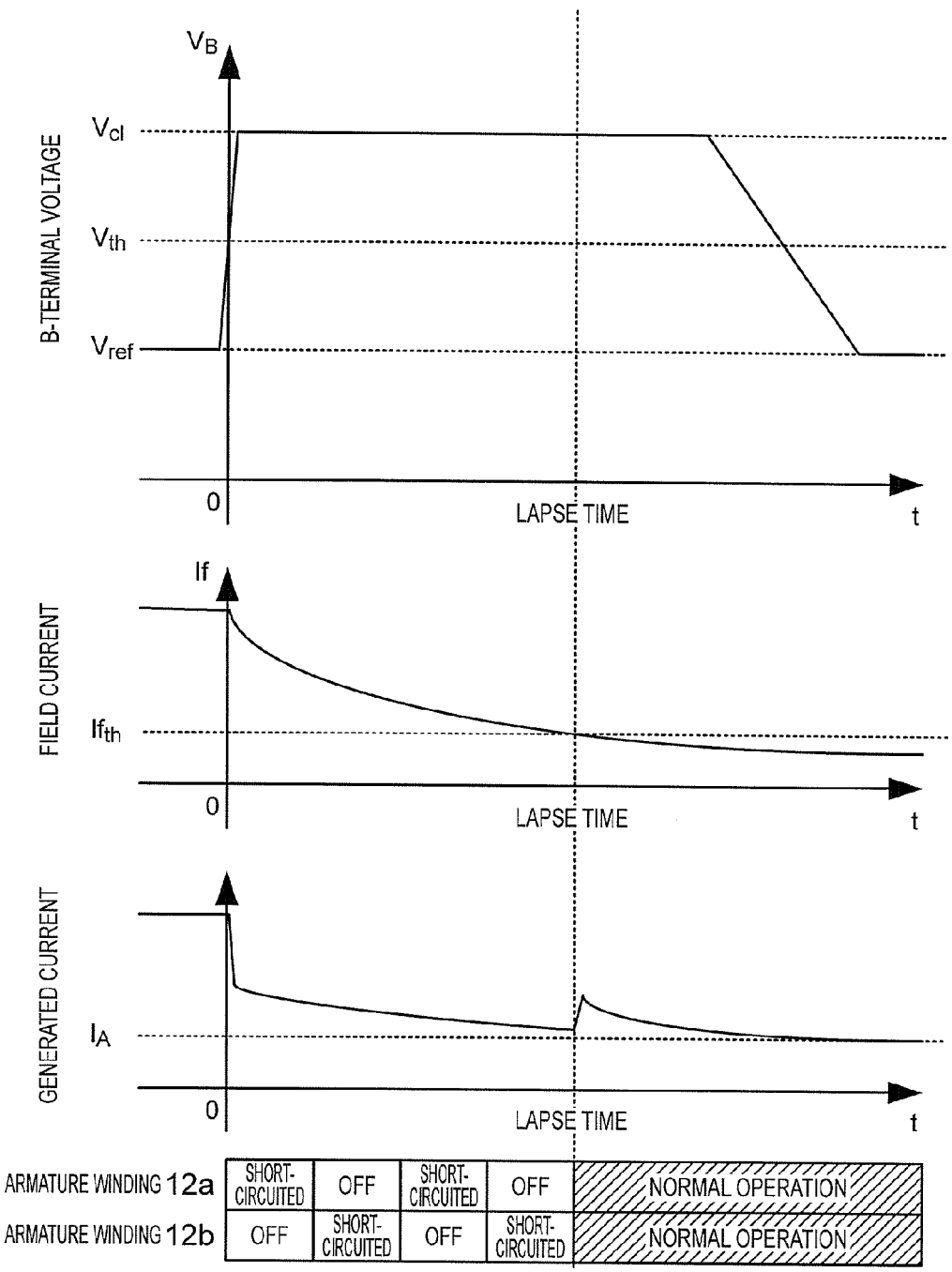
FIG. 7 is a timing chart showing an operation of a power converter according to a fifth embodiment of the present invention.

In the following, an operation of the power converter 20 during load dump is described with reference to FIG. 7. FIG. 7 is a timing chart showing the operation of the power converter 20 according to the fifth embodiment of the present invention. Note that, the condition of starting the operation of reducing load dump energy is the same as in the above-mentioned first embodiment, and hence a description thereof is omitted.

In FIG. 7, at the start of the operation of reducing load dump energy, the control section 24 turns on all the MOSFETs (UL34, VL35, and WL36) of the negative arm of the bridge circuit connected to the armature winding 12a and turns off all the MOSFETs (UH31, VH32, and WH33) of the positive arm thereof. Further, the control section 24 simultaneously turns off all the MOSFETs (XH41, YH42, ZH43, XL44, YL45, and ZL46) connected to the armature winding 12b.

Then, after the lapse of a constant time period (for example, 2.5 ms), the control section 24 turns off all the MOSFETs (UL34, VL35, and WL36) of the negative arm of the bridge circuit connected to the armature winding 12a and simultaneously turns on all the MOSFETs (XL44, YL45, and ZL46) of the negative arm of the bridge circuit connected to the armature winding 12b. In this way, the armature winding to be short-circuited is switched to the armature winding 12b. Also thereafter, the control section 24 switches the armature winding to be short-circuited every given time period until the field current decreases to the given constant current value $If_{th}$.

In the above-mentioned first embodiment, the MOSFETs subjected to avalanche breakdown are limited to the MOSFETs connected to one armature winding, and hence the heat generation concentrates on those MOSFETs. According to the fifth embodiment, however, the MOSFETs subjected to avalanche breakdown are switched over every constant time period, and hence the heat generation of the MOSFETs can be dispersed.

REFERENCE SIGNS LIST 1 power generator, 2 battery, 3a, 3b vehicle electric load, 4 engine, 5 belt, 10 rotating electrical machine, 11 field winding, 12a, 12b armature winding, 20 power converter, 21 field power conversion section, 22 armature power conversion section, 23 field current sensor, 24 control section.

The invention claimed is:

1. A power converter, which is built in a power generator, the power converter being connected to a rotating electrical machine including a field winding and a plurality of sets of armature windings and being configured to convert AC power generated by the rotating electrical machine into DC power,
    the power converter comprising:
    a field power conversion section for controlling a field current flowing in the field winding;
    an armature power conversion section comprising bridge circuits, the bridge circuits being provided correspondingly to the plurality of sets of armature windings and each comprising switching elements of a positive arm and switching elements of a negative arm; and
    a control section configured to, when it is detected that a voltage between a B-terminal and an E-terminal, configured as input or output terminals of the power generator, has exceeded a first predetermined voltage value:
        turn on, simultaneously, all the switching elements of one of the negative arm or the positive arm of the bridge circuit connected to one of the plurality of sets of armature windings and turn off, simultaneously, all the switching elements of the other one of the positive arm or the negative arm that is paired in the same bridge circuit with the one of the negative arm and the positive arm;
        reduce the field current flowing in the field winding to start an operation of reducing load dump energy; and
        thereafter turn off all the turned-on switching elements when a predetermined condition is satisfied,
    wherein the control section, when it is detected that the voltage between the B-terminal and the E-terminal has exceeded the first predetermined voltage value is configured to simultaneously turn off all the switching elements of both the negative arm and the positive arm of a bridge circuit connected to another of the plurality of sets of armature windings.

2. A power converter according to claim 1, wherein the control section is configured to determine that the predetermined condition is satisfied when the field current becomes equal to or less than a predetermined current value after the start of the operation of reducing the load dump energy.

3. A power converter according to claim 2, wherein, when it is detected that the voltage between the B-terminal and the E-terminal falls below a second predetermined voltage value after the start of the operation of reducing the load dump energy, the control section finishes the operation of reducing the load dump energy, and inhibits the operation of reducing the load dump energy thereafter.

4. A power converter according to claim 2, wherein, when the operation of reducing the load dump energy is started, the control section short-circuits the armature windings of a different set from a set of armature windings that are short-circuited in a previous operation of reducing the load dump energy.

5. A power converter according to claim 2, wherein, after the operation of reducing the load dump energy is started, the control section switches a set of armature windings to be short-circuited from one to another set every constant time period.

6. A power converter according to claim 1, wherein the control section is configured to determine that the predetermined condition is satisfied when a predetermined time period has elapsed after the start of the operation of reducing the load dump energy.

7. A power converter according to claim 6, wherein, when it is detected that the voltage between the B-terminal and the E-terminal falls below a second predetermined voltage value after the start of the operation of reducing the load dump energy, the control section finishes the operation of reducing the load dump energy, and inhibits the operation of reducing the load dump energy thereafter.

8. A power converter according to claim 6, wherein, when the operation of reducing the load dump energy is started, the control section short-circuits the armature windings of a different set from a set of armature windings that are short-circuited in a previous operation of reducing the load dump energy.

9. A power converter according to claim 6, wherein, after the operation of reducing the load dump energy is started, the control section switches a set of armature windings to be short-circuited from one to another set every constant time period.

10. A power converter according to claim 1, wherein, when it is detected that the voltage between the B-terminal and the E-terminal falls below a second predetermined voltage value after the start of the operation of reducing the load dump energy, the control section finishes the operation of reducing the load dump energy, and inhibits the operation of reducing the load dump energy thereafter.

11. A power converter according to claim 1, wherein, when the operation of reducing the load dump energy is started, the control section short-circuits the armature windings of a different set from a set of armature windings that are short-circuited in a previous operation of reducing the load dump energy.

12. A power converter according to claim 1, wherein, after the operation of reducing the load dump energy is started, the control section switches a set of armature windings to be short-circuited from one to another set every constant time period.

13. A control method for a power converter, which is built in a power generator, the power converter being connected to a rotating electrical machine including a field winding and a plurality of sets of armature windings and being configured to convert AC power generated by the rotating electrical machine into DC power, the control method comprising, when it is detected that a voltage between a B-terminal and an E-terminal, configured as input or output terminals of the power generator, has exceeded a first predetermined voltage value, the steps of:
turning on, simultaneously, all switching elements of one of a negative arm or a positive arm of a bridge circuit connected to one of the plurality of sets of armature windings and turning off, simultaneously, all the switching elements of the other one of the positive arm or the negative arm that is paired in the same bridge circuit with one of the negative arm and the positive arm;
reducing a field current flowing in the field winding; and
thereafter turning off all the turned-on switching elements when a predetermined condition is satisfied,
when it is detected that the voltage between the B-terminal and the E-terminal has exceeded the first predetermined voltage value, turning off, simultaneously, all the switching elements of both the negative arm and the positive arm of a bridge circuit connected to another of the plurality of sets of armature windings.

* * * * *